United States Patent [19] // [11] 4,031,159
Mandai et al. // [45] June 21, 1977

[54] METHOD FOR PREPARATION OF POLYOLEFIN OIL

[75] Inventors: Hiroshi Mandai, Chiba; Toshiyuki Ukigai, Yachiyo; Anri Tominaga, Higashi-Iko; Michito Sato, Yokohama, all of Japan

[73] Assignee: Lion Fat & Oil Co., Ltd., Tokyo, Japan

[22] Filed: July 22, 1976

[21] Appl. No.: 707,612

[30] Foreign Application Priority Data

July 29, 1975 Japan .............................. 50-92199

[52] U.S. Cl. ...................................... 260/683.15 B
[51] Int. Cl.² ............................................ C07C 3/18
[58] Field of Search ........................... 260/683.15 B

[56] References Cited

UNITED STATES PATENTS 3,833,678   9/1974   Brennan .................... 260/683.15 B

*Primary Examiner*—C. Davis
*Attorney, Agent, or Firm*—Woodhams, Blanchard and Flynn

[57] ABSTRACT

A method of preparing a polyolefin oil in the present invention comprises polymerizing an olefin having 6 or more carbon atoms in the presence of a catalyst mixture consisting of a polyester of polycarboxylic acid and an aluminum halide. The thus prepared polyolefin oil has a low viscosity and a high viscosity index. When the foregoing polymerization is effected by adding aluminum powder to said catalyst mixture, the content of halogen in the resulting polyolefin oil can be decreased all the more.

8 Claims, No Drawings

METHOD FOR PREPARATION OF POLYOLEFIN OIL

BACKGROUND OF THE INVENTION

The present invention relates to a method for preparation of polyolefin oils, and particularly relates to a method for preparation of polyolefin oils which can practically or perfectly prevent halogen from being present in the polymerization product and provide polyolefin oils of high viscosity index at a high yield.

The art of polymerizing olefins in the presence of Lewis acid such as aluminum chloride is well known. However, there have been quite a few instances where a polyolefin oil qualified for use as lubricant and the like was successfully prepared industrially by this method. The reason is that polyolefin oils useful for lubricant such as grease, gas turbine engine oil, hydraulic fluids for aircraft, etc. or textile finishing agent or cosmetic base are required to have a relatively low viscosity and a high viscosity index, whereas it is very difficult to obtain polyolefin oils meeting this requirement at a high yield by the use of the well-known Lewis acid catalysts. It is admittedly possible to obtain a polyolefin oil with low viscosity, subject to effecting polymerization at a high temperature, even by the use of Lewis acid. However, this method is defective in that isomerization of the olefin would concur with the polymerization reaction, whereby not only the viscosity index of the polymerization product lowers but also the yield decreases, and a lot of halogen contained in the catalyst gets mixed in the polymerization product.

The presence of halogen mixed in the polymerization product has a bad influence of grave importance on the process of aftertreatment of the polymerization product. For instance, at the time of removing the unreacted olefin and/or olefin dimer from the polymerization product by distillation, there takes place the thermal cracking of a part of the halogen in the polyolefin oil to give rise to hydrogen halide, entailing such a trouble that the distillation apparatus gets corroded thereby. Furthermore, at the time of saturating double bonds remaining in the polymerization product for the purpose of improving the oxidation stability and/or thermal stability thereof, there occurs such a trouble that the halogen spoils the hydrogenation catalyst and, to cite an extreme case, the hydrogenation catalyst is perfectly disqualified for reuse. Therefore, this method has a drawback that the ratio of the cost of hydrogenation treatment to the cost of manufacturing the polyolefin oil becomes extraordinarily high.

Under such circumstances, there has so far been proposed a method comprising polymerizing lower grade olefins by the use of a catalyst prepared by mixing aluminum chloride with metallic aluminum powder or metallic zinc powder thereby to prevent halogen from getting mixed in the polymerization product and at the same time improve the yield compared with the case wherein aluminum chloride is exclusively employed as catalyst. This method admittedly renders it possible to obtain a polyolefin oil containing no halogen at a reasonable yield as long as the polymerization is effected at a relatively high temperature. However, even in this method, the viscosity index of the resulting polymerization product is low like in the case of employing aluminum chloride exclusively as catalyst, and the yield is not necessarily satisfactorily high.

In U.S. Pat. No. 3952071, there is disclosed a method of preparing an olefin oligomer having a low viscosity and a high viscosity index. In this method, a mixture of a polyhydric alcohol derivative and aluminum chloride, said derivative being obtained by replacing the hydrogen atoms of all the hydroxyl groups of the polyhydric alcohol either by acyl groups exclusively or by acyl groups and alkyl groups, both of said groups having 1 to 20 carbon atoms, is used as polymerization catalyst. According to this method, an olefin oligomer scarcely containing halogen can admittedly be obtained at a good yield, but no suggestion is given thereby as to the use of ester of polycarboxylic acid as one ingredient of a catalyst mixture.

SUMMARY OF THE INVENTION

The present invention proposes a method of preparing polyolefin oils which can practically or perfectly prevent halogen from getting mixed in the polymerization product and produce a polyolefin oil having a relatively low viscosity and a high viscosity index at a high yield. In other words, the method proposed in the present invention covers two methods of preparing polyolefin oils, and one of said methods of the present invention comprises polymerizing an olefin having 6 or more carbon atoms in the presence of a mixture of (a) a polyester obtained by esterifying all the carboxyl groups of a carboxylic acid having 2 to 20 carbon atoms with aliphatic saturated alcohol having 1 to 20 carbon atoms and (b) an aluminum halide in an amount of 0.7 to 2.0 moles per 1 ester bond of said polyester. According to this method, a polyolefin oil which scarcely contains halogen and has a viscosity (to wit, kinematic viscosity at 100° F., the same applies hereinafter) in the range of about 40 – 90 centistokes and a viscosity index (VIE) of 130 or more can be obtained at a yield of 83% or more.

The other method of the present invention comprises polymerizing an olefin having 6 or more carbon atoms in the presence of a mixture prepared by further adding metallic aluminum powder to the foregoing mixture consisting of (a) a polyester and (b) an aluminum halide. According to this method, a polyolefin oil which contains no halogen at all and has a viscosity in the range of about 40 – 90 centistokes and a viscosity index (VIE) of 130 or more can be obtained at a yield of 83% or more.

The 'polyolefin oil which scarcely contains halogen' in the present specification means a polyolefin oil having properties such that, when one and the same Raney nickel catalyst is repeatedly used for performing hydrogenation treatment 3 times, each of said hydrogenation treatment comprising the processes of subjecting said polyolefin oil to about 3 hours' hydrogenation employing said Raney nickel catalyst in an amount of 3 wt.% based on the polyolefin oil under the condition that 10 kg/cm$^2$ in hydrogen pressure and 150° C in reaction temperature, separating the catalyst from the resulting hydrogenated oil thereafter and reusing the thus separated catalyst for the next hydrogenation treatment performed under the same condition as above, the bromine number of the hydrogenated oil obtained through the third hydrogenation treatment is less than 0.3. Likewise, the 'polyolefin oil which contains no halogen at all' in the present specification means an polyolefin oil having properties such that, when one and the same Raney nickel catalyst is repeatedly used for performing hydrogenation treatment 10 times by applying the same processes as in the foregoing method, the bromine number of the hydrogenated oil obtained through the tenth hydrogenation treatment is less than 0.5.

In this connection, in the case of a polyolefin oil wherein relatively much halogen is present, deterioration of the activity of catalyst at the time of hydrogenation treatment is remarkable so that repeated use of the hydrogenation catalyst is quite impossible. It is further added for precaution's sake that in the present invention the measurement of the halogen content in the polyolefin oil has been conducted by an indirect means as above for there is available no apposite method of directly measuring said content at present.

As will be understood from the foregoing description, in the present invention, it is mandatory to use a mixture of a polyester of polycarboxylic acid and an aluminum halide or a mixture prepared by further adding metallic aluminum powder to the foregoing mixture. The polyester for this purpose is obtained by esterifying all the carboxylic groups of a carboxylic acid having 2 to 20 carbon atoms with an aliphatic saturated alcohol having 1 to 20 carbon atoms, and to give concrete examples of ideal polyester, there are diethyl ester, dipropyl ester and dioctyl ester of malonic acid, diethyl ester, dibutyl ester and dioctyl ester of succinic acid, diethyl glutarate, diethyl adipate, diethyl pimelate, diethyl suberate, etc.

As the aluminum halide for use in the present invention, any of aluminum fluoride, aluminum chloride, aluminum bromide and aluminum iodide is applicable, but the use of aluminum chloride is most desirable.

In the case of mixing metallic aluminum powder with the polymerization catalyst of the present invention, the appropriate amount of said powder is in the range of 2.7 − 135 g per 1 mole of said aluminum halide; in the case where the amount of said powder is less than this range, it is impossible to obtain a polyolefin oil completely free of halogen. On the other hand, it is permissible to use said metallic aluminum powder in an amount exceeding this range. However, even when a large quantity of aluminum metal is used, any substantial enhancement of the effect cannot be expected under normal conditions.

The method of polymerization under the present invention is a method of polymerizing an olefin in the presence of a mixture of a polyester and an aluminum halide or a mixture of a polyester, an aluminum halide and metallic aluminum powder as described above, and as the starting material olefin, either of an alpha-olefin or an internal olefin having 6 or more carbon atoms is applicable. To give examples of typical starting olefin, there are hexene-1, octene-1, 2-ethyl octene-1, tridecene-3, octadecene-2, etc. A mixture of two or more olefins is of course useful as the starting olefin.

As to the condition for polymerization, strictly speaking, the reaction temperature varies with the kind of polyester as well as aluminum halide, coupled with the ratio of volume of these two ingredients to the metallic aluminum powder, but it is usually in the range of 50° − 150° C. And, generally speaking, in the case where the reaction temperature is too low, halogen is apt to get mixed in the polyolefin oil, while in the case where it is too high, the viscosity index of the polyolefin oil is apt to decrease. As the pressure for reaction, atmospheric pressure is ordinarily adopted, but it is of course possible to effect the reaction under an elevated pressure.

As to the procedure for effecting polymerization, it is an ordinary way to mix the polyester with the other catalyst ingredients and then add a starting material olefin to the resulting mixture thereby to effect polymerization, but it also will do to admix the catalyst ingredients of the present invention within an appropriate inactive solvent and then add a starting material olefin to the resulting solution.

The method for polymerization under the present invention can be practiced even in the absence of solvent. But, a solvent may be used for the purpose of facilitating the control of the reaction temperature. The solvent for this purpose can be illustrated by n-pentane, n-octane, iso-octane, trichloroethane, tetrafluoroethane, etc. The appropriate amount of the reaction solvent is in the range of 25 − 200% by volume based on the starting material olefin.

In the case where it is desired to remove the unreacted olefin and/or olefin dimer from the polymerization product obtained by the method of the present invention, it can be achieved through the conventional distillation process or extraction process. And, if it is desired to improve the oxidation stability and/or thermal stability of a polyolefin oil obtained by the present method, it can be easily achieved by saturating double bonds remaining in said polyolefin oil by the use of a hydrogenation catalyst such as Raney nickel, nickel on kieselguhr, etc.

As will be understood from the above elucidation, according to the method of the present invention, a polyolefin oil having a relatively low viscosity and a high viscosity index and being in the state of practically or perfectly free of halogen can be obtained at a high yield. And, inasmuch as the polyolefin oil obtained by the present method is substantially free of halogen, it will not cause corrosion of the distillation apparatus at the time of refining said oil by distillation, nor will it spoil the hydrogenation catalyst at the time of hydrogenation treatment as seen in the prior art.

DESCRIPTION OF THE PREFERRED EMBODIMENTS

EXAMPLE

After putting polyester, aluminum chloride and metallic aluminum powder in the respective amounts shown in the following Table-1 in a 1 l glass autoclave with stirrer and elevating the temperature up to 100° C, by continuously stirring for 1 hour, varieties of polymerization catalysts were prepared. Subsequently, by adding 600 g of the respective starting olefins shown in the table to each of the thus obtained catalysts dropwise, polymerization was effected at a prescribed reaction temperature for 5 hours. In this context, in the case of Run No. 6, 300 g of iso-octane were employed as reaction solvent.

Table 1

| Run No. | Starting olefin | (a)Polyester | (g) | (b)AlCl$_3$ (g) | Molar ratio of (a) to (b) | Al powder (g) |
|---|---|---|---|---|---|---|
| 1 | olefin mixture | diethyl malonate | 7.21 | 12 | 1:2 | — |
| 2 | " | " | 7.21 | " | " | — |
| 3 | " | " | 9.37 | " | 1.3:2 | — |

Table 1-continued

| Run No. | Starting olefin | (a)Polyester | (g) | (b)AlCl₃ (g) | Molar ratio of (a) to (b) | Al powder (g) |
|---|---|---|---|---|---|---|
| 4 | " | " | 10.81 | " | 1.5:2 | — |
| 5 | " | " | 6.74 | " | 0.9:2 | — |
| 6 | octene-1 | " | 7.21 | " | 1:2 | — |
| 7* | " | " | 3.60 | " | 0.5:2 | — |
| 8* | " | " | 30.99 | " | 4.3:2 | — |
| 9 | " | " | 7.21 | " | 1:2 | — |
| 10 | olefin mixture | diethyl succinate | 7.8 | " | " | — |
| 11 | " | diethyl glutarate | 9.28 | " | " | — |
| 12 | " | diethyl adipinate | 9.91 | " | " | — |
| 13 | " | diethyl pimelate | 10.54 | " | " | — |
| 14 | " | diethyl suberate | 11.17 | " | " | — |
| 15 | " | diethyl malonate | 7.21 | " | " | 2.4 |
| 16 | " | " | 7.21 | " | " | 4.8 |
| 17 | " | " | 7.21 | " | " | 0.12 |
| 18 | " | diethyl succinate | 7.8 | " | " | 2.4 |
| 19 | " | diethyl glutarate | 9.28 | " | " | " |
| 20 | " | diethyl adipinate | 9.91 | " | " | " |

Remarks
1. The mark "*" represents a run for reference purpose.
2. The olefin mixture in Run Nos. 1 – 5 and Nos. 10 – 20 was a mixture composed of alpha-olefins having 6, 8 and 10 carbon atoms, respectively, at the molar ratio of 1:1:1.

After completing the reaction, ammonia gas was blown into the polymerization product thereby to inactivate the catalyst and the thus precipitated catalyst was removed by distillation. Then, the product was subjected to distillation to remove the unreacted olefin and olefin dimer therefrom, whereby a polyolefin oil was obtained respectively.

The yield, viscosity and viscosity index of the polyolefin oil obtained as above were as shown in the following Table-2. Further, when 500 g each of the respective polyolefin oils obtained in these runs were subjected to hydrogenation treatment under a hydrogen pressure of 10 kg/cm² and at a temperature of 150° C for 3 hours in the presence of 15 g of Raney nickel catalyst and the bromine number of the resulting hydrogenated oil was measured, the results were as shown in the same table.

Furthermore, the amount of halogen contained in the respective polyolefin oils was evaluated through the following procedure. First, the distillation apparatus used in removing the unreacted olefin and olefin dimer from the polymerization product was examined to confirm whether there was any corrosion thereof. Next, by repeating the hydrogenation treatment of the polyolefin oil refined through distillation by repeatedly using Raney nickel catalyst exclusively, the frequency of reuse of the catalyst and the number of bromine of the hydrogenated oil were sought. The result was also shown in Table-2.

Table 2

| Run No. | Reaction temperature (° C) | Yield (%) | Kinematic Viscosity at 100° F (centistoke) | Viscosity index (VIE) | Bromine number of hydrogenated oil | Corrosion of hydrogenation apparatus | Frequency of reuse and bromine number |
|---|---|---|---|---|---|---|---|
| 1 | 100 | 85.3 | 68.47 | 131 | 0.3 | nil | 3 times; 0.3 |
| 2 | 120 | 89.4 | 65.28 | 130 | " | " | " |
| 3 | " | 90.1 | 51.12 | " | " | " | " |
| 4 | 140 | 84.3 | 75.44 | 131 | " | " | " |
| 5 | 120 | 86.5 | 90.42 | 130 | " | " | " |
| 6 | " | 87.3 | 71.42 | 133 | " | " | " |
| 7* | " | 80.2 | 84.23 | 126 | 3.0 | some | unqualified for reuse |
| 8* | 140 | 34.2 | 34.69 | 124 | 0.3 | nil | 3 times; 0.5 |
| 9 | 100 | 91.3 | 47.62 | 131 | " | " | 3 times; 0.3 |
| 10 | 120 | 86.3 | 46.34 | 130 | " | " | " |
| 11 | " | 83.4 | 52.12 | " | " | " | " |
| 12 | " | 85.6 | 50.23 | 131 | " | " | " |
| 13 | " | 83.9 | 49.69 | 132 | " | " | " |
| 14 | " | 87.3 | 43.65 | 131 | 0.2 | " | " |
| 15 | " | 95.6 | 67.92 | 132 | " | " | 10 times; 0.3 |
| 16 | " | 97.2 | 68.23 | " | " | " | " |
| 17 | " | 86.2 | 67.34 | 131 | 0.3 | " | 3 times; 0.2 |
| 18 | " | 94.2 | 47.23 | " | 0.2 | " | 10 times; 0.3 |
| 19 | " | 95.2 | 52.12 | 130 | " | " | " |
| 20 | " | 96.3 | 51.34 | " | " | " | " |

Remark
The mark "*" represents a run for reference purpose.

As is clear from the showings in the above table, when an olefin is polymerized in the presence of a mixture of a polyester and an aluminum halide according to the method of the present invention, a polyolefin oil useful as synthetic lubricant, textile-finishing agent, cosmetic base, etc. can be obtained at a high yield. Further, it will be understood from Table-2 below that, when the polymerization catalyst is made to contain an available amount of aluminum powder, the content of halogen in the resulting polyolefin oil can be reduced all the more.

What is claimed is:

1. A method of preparing a polyolefin oil comprising polymerizing an olefin having 6 or more carbon atoms at a temperature in the range of from 50° to 150° C in the presence of a catalyst mixture consisting of a polyester and an aluminum halide, said polyester being obtained by esterifying all the carboxyl groups of a polycarboxylic acid having 2 to 20 carbon atoms with an aliphatic saturated alcohol having 1 to 20 carbon atoms.

2. A method according to claim 1, wherein the amount of aluminum halide to be contained in said catalyst mixture is in the range of from 0.7 to 2.0 moles per 1 ester bond of said polyester and in the range of from 0.5 to 12 mol. % based on said olefin.

3. A method according to claim 1, wherein said catalyst mixture further contains metallic aluminum powder.

4. A method according to claim 3, wherein the amount of said metallic aluminum powder is in the range of from 2.7 to 135 g per 1 mole of said aluminum halide.

5. A method according to claim 1, wherein said polyester is selected from the group consisting of diethyl malonate, dipropyl malonate, dioctyl malonate, diethyl succinate, dibutyl succinate, dioctyl succinate, diethyl glutarate, diethyl adipate, diethyl pimelate, and diethyl suberate.

6. A method according to claim 1, wherein said aluminum halide is aluminum chloride.

7. A method according to claim 1, wherein a catalyst mixture is prepared by adding said aluminum halide to said polyester and then said olefin is added to the thus prepared catalyst mixture.

8. A method according to claim 1, wherein said polymerization is effected in a solvent selected from the group consisting of n-pentane, iso-octane, trichloroethane and tetrafluoroethane in an amount ranging from 25 to 100% by volume, based on the olefin.

* * * * *